United States Patent [19]

Reuschel et al.

[11] 4,030,299
[45] June 21, 1977

[54] INTENSIFIED CYLINDER ASSEMBLY

[75] Inventors: Donald L. Reuschel, Hamilton; James W. Hendry, Holland, both of Mich.

[73] Assignee: Ex-Cell-O Corporation, Troy, Mich.

[22] Filed: Dec. 20, 1974

[21] Appl. No.: 534,604

[52] U.S. Cl. .................................. 60/560; 60/563
[51] Int. Cl.² ........................................ F15B 7/00
[58] Field of Search ........... 60/563, 560, 486; 91/6, 91/167

[56] References Cited

UNITED STATES PATENTS

| | | | |
|---|---|---|---|
| 437,933 | 10/1890 | Naylor | 60/563 |
| 1,028,356 | 6/1912 | Iverson | 60/563 X |
| 1,930,155 | 10/1933 | Weidmann | 60/563 |
| 1,970,999 | 8/1934 | Ferris et al. | 60/563 |
| 2,169,423 | 8/1939 | Kessler et al. | 60/563 |
| 2,396,539 | 3/1946 | Smith et al. | 60/560 |
| 2,587,571 | 2/1952 | Lombard | 60/563 X |
| 2,990,687 | 7/1961 | McCrea | 60/563 X |
| 3,021,802 | 2/1962 | Glas | 60/563 |
| 3,564,842 | 2/1971 | Van Marle | 60/563 |

Primary Examiner—Edgar W. Geoghegan
Attorney, Agent, or Firm—James H. Bower; Frank D. Risko

[57] ABSTRACT

This invention embodies an intensifier cylinder assembly within the main hydraulic ram of a plastic molding machine whereby the clamping force holding the mold halves together can be increased during the shot cycle of the machine by at least three times the normal clamp force of the machine. Additionally, the location of the intensifier reduces the number of high pressure hydraulic fittings in the machine improving the safety factor while reducing the overall cost of the intensifier itself since the ram piston now becomes the housing for the intensifier piston.

9 Claims, 6 Drawing Figures

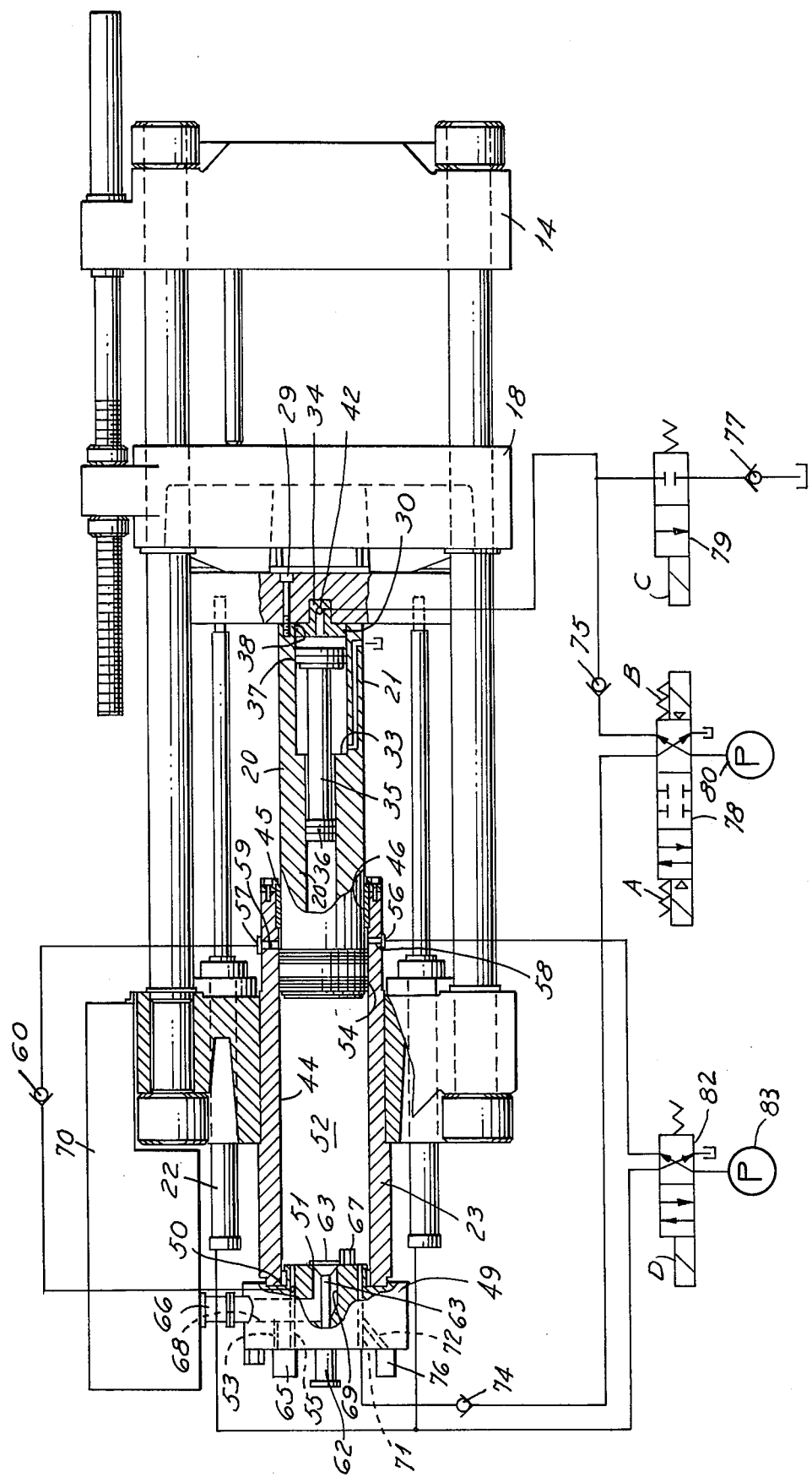

4,030,299

INTENSIFIED CYLINDER ASSEMBLY

BACKGROUND OF THE INVENTION

1. Field of the Invention

This invention relates to a hydraulically operated clamp as used in injection molding and die casting machines and specifically to an improved intensifier cylinder embodied within the main hydraulic ram.

2. Description of the Prior Art

The essential features of a die casting or an injection molding machine are the clamp section and the shot or extruder section depending which type of machine it is. In most machines of either type the clamp and other features are hydraulically operated for simplicity and smoothness of operation. The present art uses various means of a closing cylinder or jack ram to actuate the moving plate of the machine toward the stationary or front plate of the machine and clamp the mold halves together which are mounted on the moving plate and front plate. A hydraulic ram will lock and hold the mold halves together while the shot or extrusion step of the process takes place. To assure that the mold does not inadvertently open during the shot cycle, a mechanism called to intensifier is used to cause an increase in the actual clamp pressure and hence prevent mold separation and flashing on the part being manufactured. Excessive flashing requires a secondary operation, which is costly, to remove it from the part and also if the mold separation is excessive, it will result in the scrappage of parts. Intensifiers have been used in die casting machines for intensifying the shot cylinder ram as described in U.S. Pat. No. 2,829,498 and is sufficient in that application and method of use. However, this application and novel method of the intensifier make a valuable and desired feature on injection molding and die casting machines.

SUMMARY OF THE INVENTION

This invention is a new and novel method and apparatus for causing the high pressures as presently used in the injection molding and die casting machine operation to be amplified by a factor of three or more to assure the secure holding by pressure intensification of the clamp ram. Further, placement of this intensifier within the body of the main hydraulic ram makes the utility and cost of this invention much more feasible over other methods of hydraulic intensification. Still further external piping of very high hydraulic pressures, especially those encountered during intensification, is practically eliminated since this invention incorporates most of the hydraulic connections as internal passages within the housings. Therefore, the safety factor is improved and the need for special high pressure tubing, hoses and fittings is virtually eliminated which reduce the cost of this assembly.

DESCRIPTION OF THE DRAWING

FIG. 5 is a sectional view of the hydraulic ram and intensifier during the intensifying cycle.

FIG. 6 is an enlarged view of the cap and ram section.

DESCRIPTION

Figure 1:
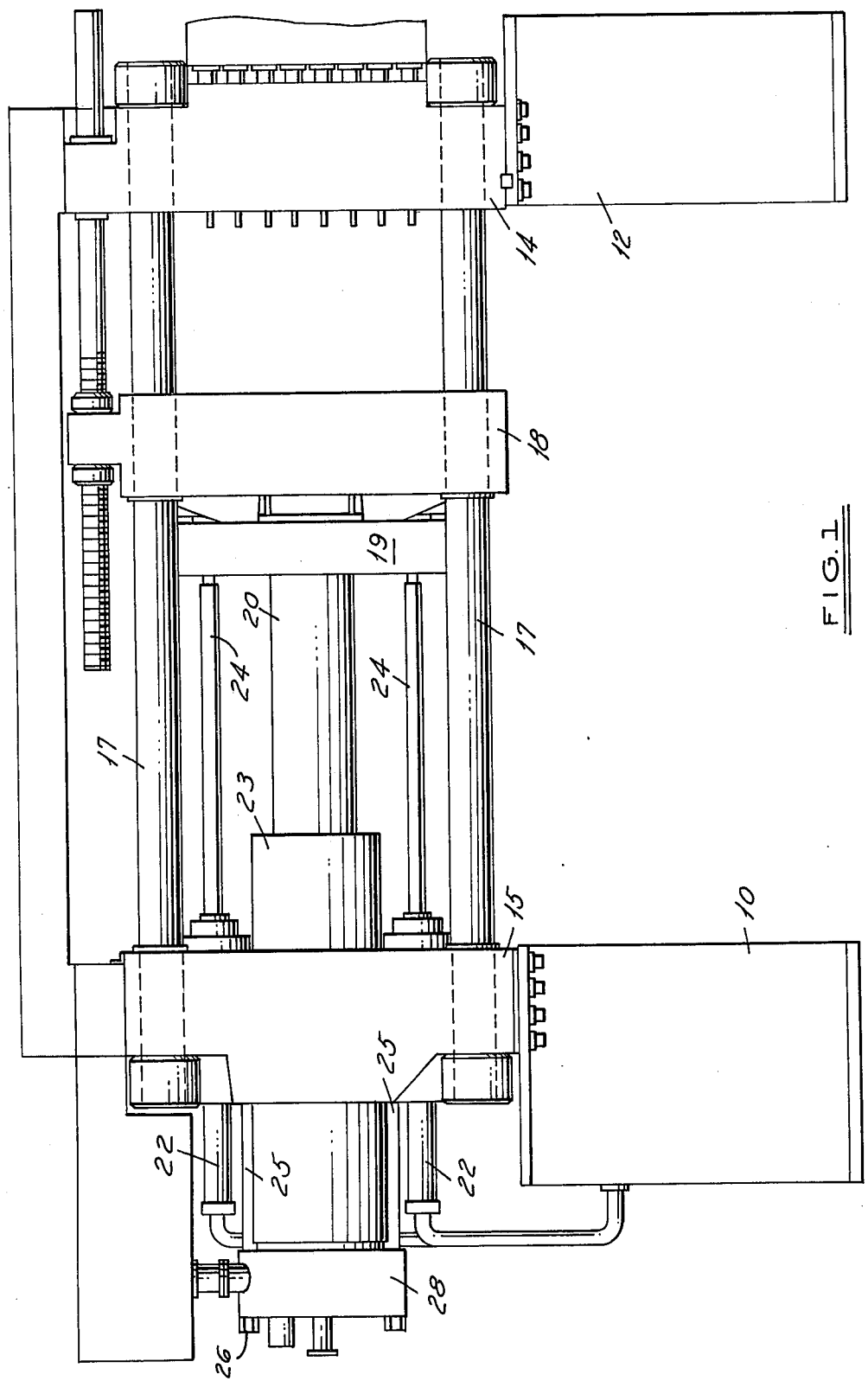
FIG. 1 is a side view of the clamp section and base of a mold machine.

Referring now to the drawings, and specifically to FIG. 1 which is a typical molding machine having a split base 10 and 12 on which are mounted the front plate 14 and rear plate 15 which secure parallel horizontal tie bars 17 by suitable means. On these tie bars 17 the movable platten or plate 18 travels to clamp the mold (not shown) closed between the front plate 14 and platten 18 which is actuated by the main hydraulic ram 20. Jack rams 22 with the rod ends 24 connected to rear platten support 19 are used to close the clamp by moving platten 18 forward during a machine cycle. The clamp cylinder 23 of the main hydraulic ram passes through and shoulders in rear plate 15 and is affixedly held by 15 staybolt 25 and nut 26 means which also secures the cylinder end cap housing 28 to clamp cylinder 23.

Figure 2:
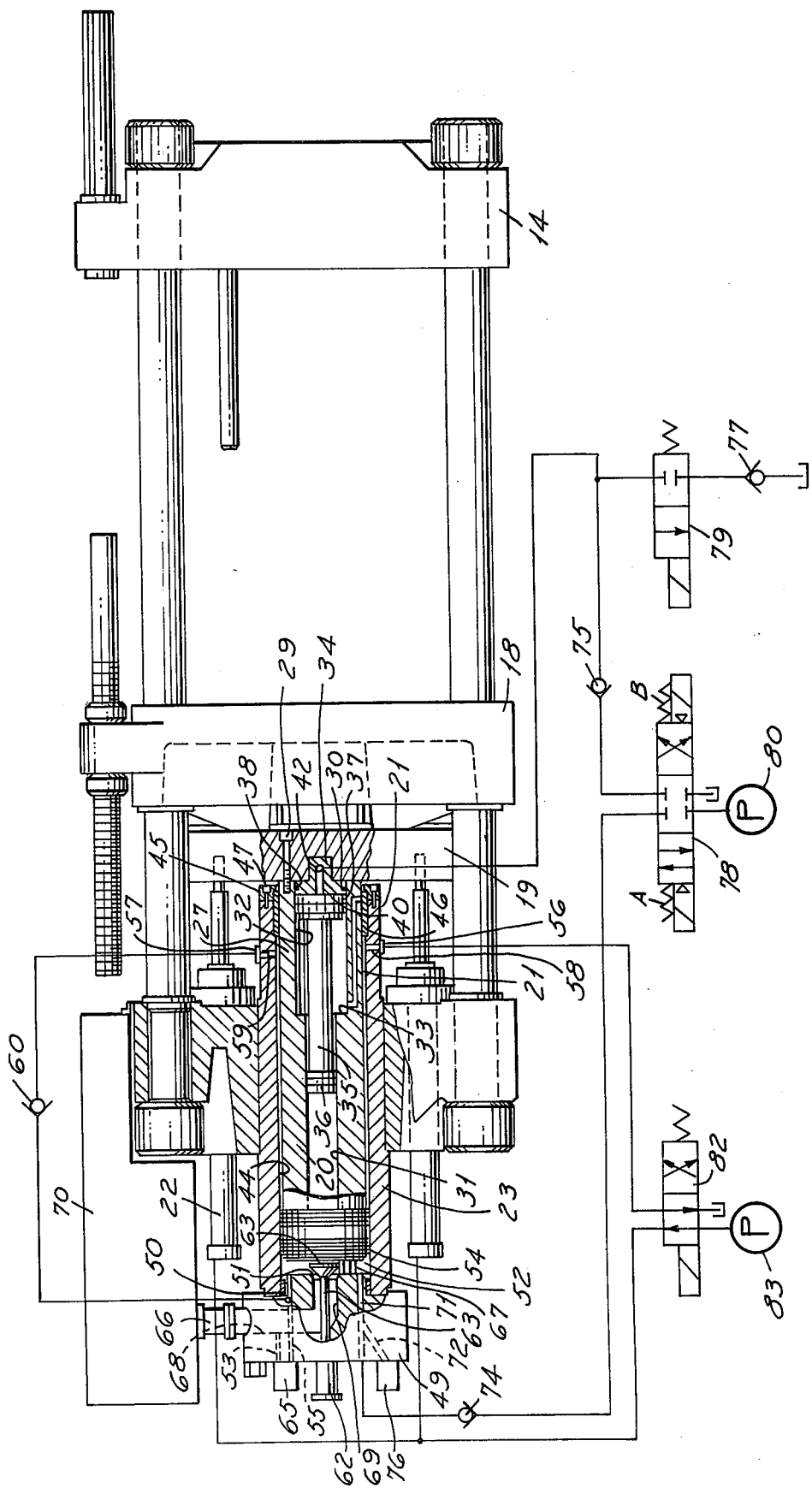
FIG. 2 is a sectional view of the hydraulic ram and intensifier with the clamp in the retracted or open position.
Figure 3:
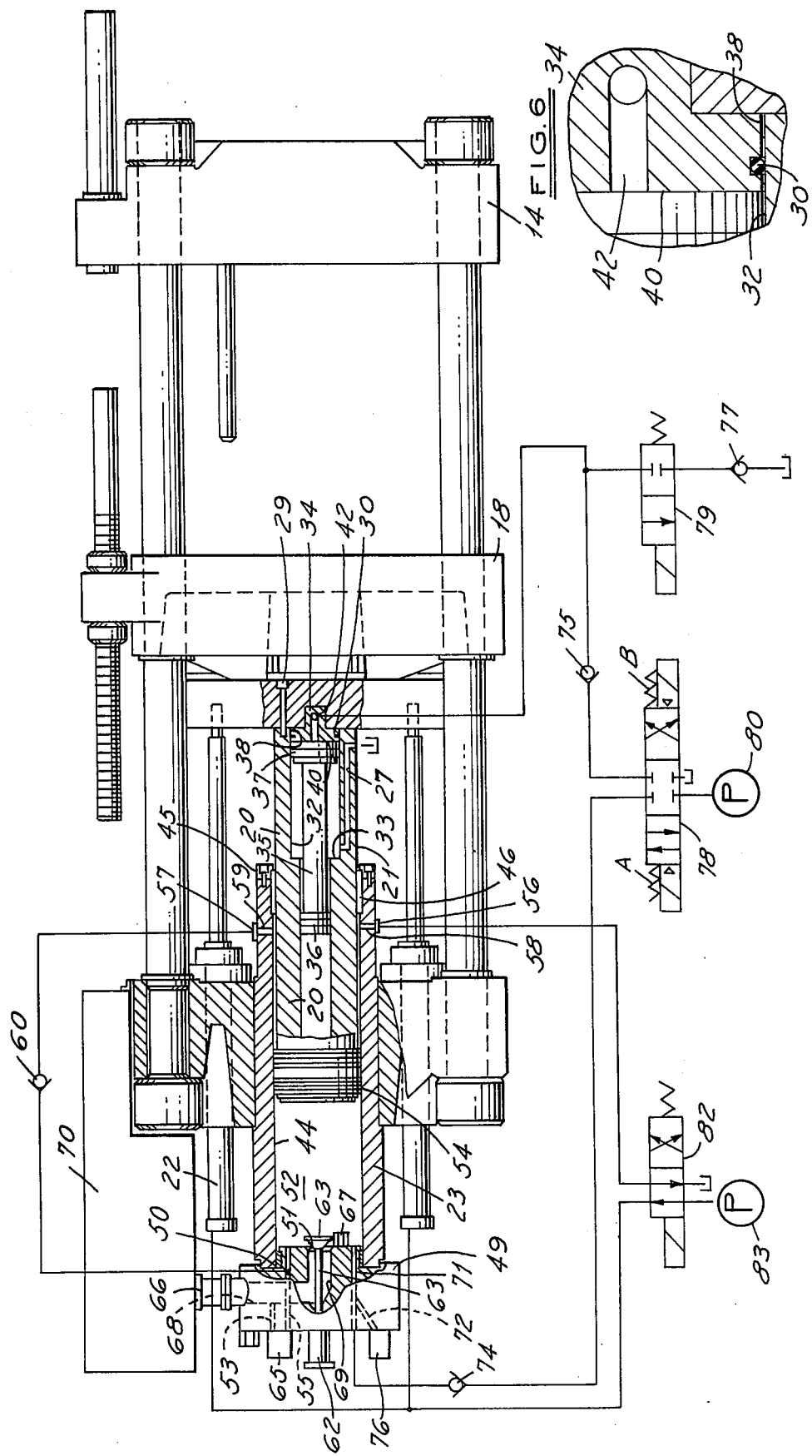
FIG. 3 is a sectional view of the hydraulic ram and intensifier with the clamp in the mid-closed position.

The preferred embodiment of this invention is shown best in FIG. 2 through 5 and is described best viewing FIG. 3 which shows main ram piston 20 fixedly attached to the rear platten support 19 by socket head screw means 29. Ram piston 20 is a tubular member having bore 32 and bore 31 which extends through ram 20 opening to chamber 52. Shoulder 33 is the transition surface between the two bores. Bore 32 is plugged with cap 34 which has an O ring seal 30 that seals between bore 32 and cap surface diameter 38. Smaller piston 35 is a stepped shaft having a rod end and head end with a high pressure seal 36 on the rod end and seal 37 on the head end sealing against bores 31 and 32 respectively. Passage 27 vents the chamber area between the rod end and head end of piston 35. Piston 35 is free to move between shoulder 33 and cap surface 40. The cap is further bored out with hole 42 connecting to the closed hydraulic circuitry shown schematically from this point.

The clamp cylinder 23 consists of a tubular member whose internal bore 44 is sealed at one end by a ring 45 which holds a packing seal and wiper 46 in place to seal the outer diameter 21 of ram piston 20. The other end of the clamp cylinder 23 is sealed by the cylinder end cap housing 49 and seal 50 which match the clamp cylinder internal bore 44. The ring 45 is affixedly held to clamp cylinder 23 by socket head cap screws 47 and the cylinder end cap housing 49 by staybolts 25 and nuts 24 (shown in FIG. 1). Seal 54 provides a high pressure sliding seal between bore 44 and ram piston 20. Hole 59 and fitting 57 are connected to bore 55 in the housing 49 via hydraulic circuitry through check valve 60.

The cylinder end cap housing 49 consists of prefill valve actuator 62 and valve 63, decompression valve 65, fill pipe 66 and pressure switch 76. Bores 68 and 69 are located so they intersect forming a communicating passage from fill pipe 66 to the chamber 52 formed by bore 44 and the end of rod 20 and housing 49. Bore 55 connects from the chamber 52 to the decompression valve 65 and bore 53 connects from decompression valve 65 to intersect with bore 68 which connects to prefill tank. Pressure switch 76 is affixedly held to housing 49 and is connected to passage 71 by bore 72. A mechanical stop 67 is affixed to housing body 49 within chamber 52. The end of communicating passage diameter 69 is chamfered to form a sealing surface 51 to coact with valve 63. A prefill tank 70 is connected to fill pipe 66 and is used as a reservoir to store hydraulic fluid during the cycle of the machine. A passage 71 connects chamber 52 to the hydraulic circuitry.

Check valves 74, 75 and 77 with the double acting valve 78, single acting valve 79 and pump 80 with a reservoir of oil (not shown) make up the hydraulic portion of the intensifier circuit. Single acting bidirectional valve 82, pump 83, and the interconnecting lines make up the other portion of the hydraulic circuitry used for actuating the jack rams 22 and for opening the clamp. Hole 58 and fitting 56 connect to the front part of the clamp cylinder 23 and the hydraulic circuitry.

OPERATION

Figure 4:
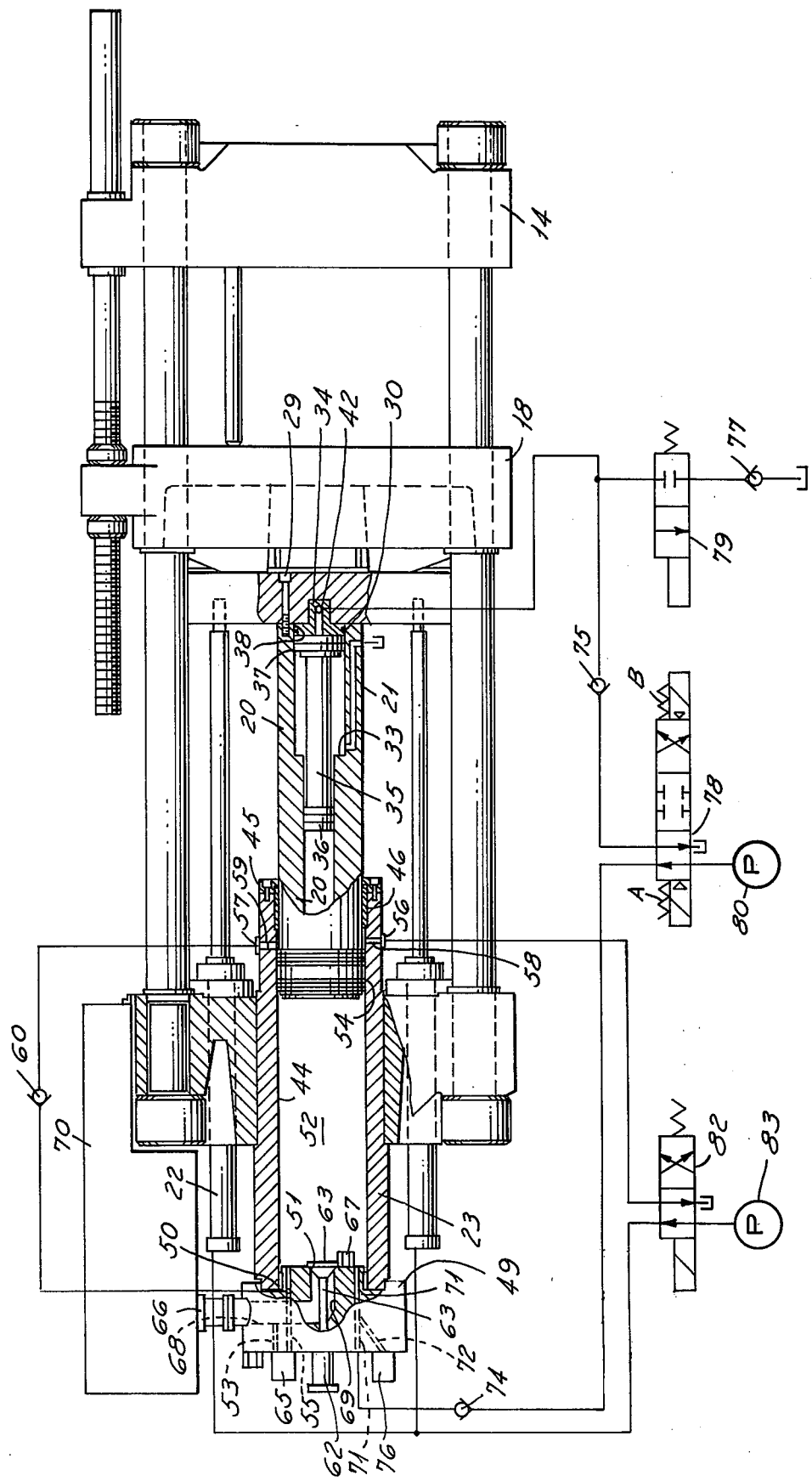
FIG. 4 is a sectional view of the hydraulic ram and intensifier with the clamp in the full forward position.

FIG. 2 shows the clamp section of the machine open with platten 18 in the rearmost position. Hydraulic ram 20 is resting against stop 67 and intensifier piston 35 is stopped against surface 40 at cap 34 in ram 20. The prefill actuator 62 is energized and valve 63 is opened to chamber 52 allowing fluid from the prefill tank to flow through communicating passages 68 and 69 via the fill pipe 66 to chamber 52. The jack rams 22 are energized by fluid flowing from pump 83 through direction valve 82 and start to move platten 18 toward front plate 14 to close the clamp and mold. As the platten 18 is moving, it is pulling ram 20 with it and hydraulic fluid will flow into chamber 52, best seen in FIG. 3, filling the void behind the ram. At the same time, fluid trapped in the chamber formed by the outside diameter of ram 20 and the bore 44 and between packing seals 54 and 46 is vented to tank via fitting 56 and bore 58 to valve 82. After the platten 18 has reached its forwardmost position as shown in FIG. 4, the prefill valve 63 is closed and pump 80 is now energized along with the A coil on the double acting directional valve 78 which now ports fluid through check valve 74 through passage 71 in housing 49 to chamber 52. Pump 83 continues to operate during this time. After a preset pressure in chamber 52 is reached and sensed by pressure switch 76 via passages 72 and 71, the oil supply is shut off by de-energizing the A coil of the directional valve 78 which now causes the fluid in chamber 52 to be trapped by the closing of check valve 74. Referring now to FIG. 5, the B coil of directional valve 78 is energized allowing fluid from pump 80 to flow through check valve 75, passage 42 in cap 34 and act on the large diameter area of intensifier piston 35. As this piston 35 moves rearward in ram 20, the small end of piston 35 exerts an intensified pressure in chamber 52. This can be easily seen in the following example: Assume the piston ram 20 has an area of 5 square inches with 2000 psi of pressure in chamber 52. This will exert a force of 10,000 pounds to hold the clamp of the machine closed. The effective force will only be 8000 pounds because the small diameter area will become a subtractive force. Further assume the area of the intensifier piston 35 large diameter area is 4 square inches and the small diameter area is one square inch. When the pressure from pump 80 is ported to the large diameter area of piston 35 the net force of the piston, if the pressure is 2000 psi from the pump, will be 8000 pounds. However, the original force on the small end of this piston 35 was only 2000 pounds (2000 psi times 1 square inch) which will produce a force on piston 35 causing it to move rearward. This movement of the piston causes an increase of the pressure in chamber 52 to 6000 psi where it is sensed by pressure switch 76 which de-energizes pump 80. After the intensified pressure of 6000 psi is reached in chamber 52, the piston 35 will stop moving and the system will be in equilibrium. However, the increased pressure in chamber 52 acting on the effective area of ram 20 will now have a clamping force of 24,000 pounds (6000 psi times 4 sq. in.). Therefore, the clamp force has been intensified by a factor of 2.4. After this condition has been reached coil B of valve 78 will de-energize and trap this pressure in chamber 52 by action of check valve 75 preventing fluid from flowing back to the directional valve 78.

In another example, assume the piston ram 20 has an area of 100 square inches with 2000 psi of pressure in chamber 52. This will exert a force of 200,000 pounds to hold the clamp of the machine closed. The effective force will only be 180,000 pounds because the small area diameter area will become subtractive as will be seen later. Further assume the area of the intensifier piston 35 large diameter is 50 square inches and the small diameter area is 10 square inches. When the pressure from pump 80 is ported to the large diameter area of piston 35 the net force, if the pressure is 2000 psi from the pump, will be 100,000 pounds. However, the original force on the small end of this piston 35 was only 20,000 pounds (2000 psi times 10 square inches) which will produce a force on piston 35 causing it to move rearward. When the intensified pressure of 8000 psi is reached in chamber 52, it will be sensed by pressure switch 76 which de-energized pump 80 and the piston 35 will stop moving and the system will be in equilibrium. However, the increased pressure in chamber 52 acting on the effective area of the ram 20 will now have a clamping force of 720,000 pounds (8000 psi × 90 sq. in.). Therefore, the clamping force has been intensified by a factor of 3.6. Therefore, the intensification system shown can increase the clamp force in a hydraulic press by factors of 2.4 to 3.6 depending on the ratio of the piston areas and the pressure used.

When the injection cycle is complete and the clamp is ready to be opened, coil C of single acting valve 79 is energized and the fluid previously trapped in the ram 20 on the large side of this intensifier piston 35 will now be vented to tank through passage 42, the hydraulic lines, valve 79 and check valve 77. The pressure from chamber 52 acting on the small end of intensifier piston 35 will push the fluid out returning the piston to the forwardmost position. The decompression valve 65 attached to housing 49 is now energized which will vent the trapped pressure of chamber 52 through passage 55 into valve 65 and back through passage 53 intersecting with bore 68 and into prefill tank 70. When this pressure is reduced to atmosphere, the prefill valve solenoid 62 will be energized and valve 63 will open chamber 52 to passages 67 and 68 to prefill tank 70 and coil C of valve 79 will be de-energized. Coil D of the switching valve 82 is energized and fluid will now flow from pump 83 through valve 82 through fitting 56 and bore 58 and start to push ram 20 to the rearmost position. Simultaneously, the jack rams 22 are vented to tank through valve 82, as ram 20 is moving rearward it will push fluid out of chamber 52 and will pull clamp open to eject the part. When the clamp is completely open, limit switches (not shown) will shut off pump 83 and de-energize coil D of valve 82 and the cycle will be complete.

Although the preferred embodiment has been described and illustrated, it will be understood that minor changes in the construction may be made within the scope of this invention without departing from the spirit of it.

I claim:

1. A ram and pressure intensifier device comprising,
    a. a hydraulic cylinder means having a ram piston means disposed therein with said cylinder means connected to a fluid pressure switching means,
    b. said ram piston means having a first and second bore means extending therethrough wherein said second bore means is vented to tank means from juncture of said first and second bore means by a passage means;
    c. an intensifier piston means disposed in said (ram piston) first and second bore means wherein rod end of intensifier piston means is disposed in said first bore means and head end of said intensifier piston means is disposed in said second bore means;
    d. head end of said second bore means and said pressure switching means in communication with a fluid pressure means; and
    e. said intensifier piston means slideable in said ram piston means wherein said first bore means communicates with cylinder chamber means.

2. The apparatus of claim 1 wherein (the fluid passage) said fluid pressure switching means (consists of) is a housing means connected to hydraulic fluid switching circuitry means in combination with a decompression valve means, a prefill valve means, and a prefill tank means.

3. The apparatus of claim 1 wherein (said ram piston means contains) slideable seal(s) (between) means are disposed on said ram piston means (and) in communication with said cylinder means.

4. The apparatus of claim 1 wherein (said intensifier piston means contains) slideable seal(s) (between) means are disposed on said intensifier piston means in communication with (and) said ram piston means.

5. A hydraulic fluid pressure intensifier device comprising,
    a. a cylinder means;
    b. a ram piston means disposed in said cylinder means forming a first chamber between said cylinder means and said ram piston means;
    c. an intensifier piston means continuously disposed within a stepped bore means forming a second chamber and said bore extending through said ram piston means communicating with said first chamber wherein the rod end of said second chamber is vented to tank; and
    d. said first chamber and head end of said intensifier piston means are connected to a fluid pressure means.

6. The apparatus of claim 5 wherein said first chamber is connected to a housing means having fluid passages contained therein with a decompression valve means, a prefill valve means, and a pressure switching means affixedly attached thereto with said housing connected to a prefill tank.

7. The apparatus of claim 10 wherein said fluid pressure means is a hydraulic fluid pump, reservoir and valve means.

8. The apparatus of claim 5 wherein slideable seals are disposed on said intensifier piston means in communication with said ram bore means, and a (said ram piston means contain) slideable seal(s) (between said intensifier piston means,) is disposed on said ram piston means (and) between said ram piston means and said cylinder means.

9. The apparatus of claim 1 wherein said fluid pressure means is a hydraulic fluid pump, reservoir and valve means.

* * * * *